United States Patent
Wu et al.

(10) Patent No.: US 11,527,752 B2
(45) Date of Patent: Dec. 13, 2022

(54) POSITIVE ACTIVE MATERIAL AND PREPARATION METHOD THEREOF, ELECTROCHEMICAL BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Qi Wu, Ningde (CN); Jinhua He, Ningde (CN); Changyin Ji, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/131,012

(22) Filed: Dec. 22, 2020

(65) Prior Publication Data
US 2021/0111405 A1   Apr. 15, 2021

Related U.S. Application Data

(63) Continuation of application No. PCT/CN2019/107909, filed on Sep. 25, 2019.

(30) Foreign Application Priority Data

Sep. 26, 2018 (CN) .......................... 201811124179.6

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/50* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS

2012/0034516 A1* 2/2012 Koo ....................... C01G 51/42
429/188
2016/0028080 A1* 1/2016 Sugiura ............. H01M 10/0525
429/223
(Continued)

FOREIGN PATENT DOCUMENTS

| CN | 102024950 A | 4/2011 |
|---|---|---|
| CN | 103459321 A | 12/2013 |

(Continued)

OTHER PUBLICATIONS

Machine Translation of KR 10-2008-0020087 A (Year: 2008).*
(Continued)

*Primary Examiner* — Robert S Carrico
(74) *Attorney, Agent, or Firm* — Morgan, Lewis & Bockius LLP

(57) ABSTRACT

This application provides a positive active material and a preparation method thereof, an electrochemical battery, a battery module, a battery pack, and an apparatus. The positive active material includes an inner core and a coating layer, where the coating layer coats a surface of the inner core. The inner core is selected from a ternary material with a molecular formula of $Li_{1+a}[Ni_xCo_yMn_zM_bM'_c]O_{2-d}Y_d$, where distribution of each of the doping elements M, M', and Y in the inner core meets the following condition: there is a reduced mass concentration gradient from an outer side of the inner core to a center of the inner core. The positive active material herein features high gram capacity, high structural stability, and high thermal stability, so that the electrochemical battery has excellent cycle performance and (Continued)

storage performance and high initial discharge gram capacity.

15 Claims, 4 Drawing Sheets

(51) Int. Cl.
 H01M 10/0525 (2010.01)
 H01M 4/36 (2006.01)
 C01G 53/00 (2006.01)
 H01M 4/02 (2006.01)
(52) U.S. Cl.
 CPC ..... H01M 10/0525 (2013.01); C01P 2002/52 (2013.01); C01P 2004/61 (2013.01); C01P 2004/84 (2013.01); H01M 2004/028 (2013.01); H01M 2220/20 (2013.01)

(56) References Cited

U.S. PATENT DOCUMENTS

| | | | | |
|---|---|---|---|---|
| 2017/0077496 A1* | 3/2017 | Liu | ........................ | H01M 4/525 |
| 2017/0155146 A1* | 6/2017 | Lee | ........................ | H01M 4/505 |
| 2018/0019464 A1* | 1/2018 | Xia | ........................ | H01M 4/131 |
| 2018/0034045 A1* | 2/2018 | Xia | ........................ | H01M 4/0471 |
| 2019/0341598 A1* | 11/2019 | Nam | ........................ | H01M 4/131 |

FOREIGN PATENT DOCUMENTS

| | | | | |
|---|---|---|---|---|
| CN | 104409700 | A | | 3/2015 |
| CN | 105336915 | A | | 2/2016 |
| CN | 105702947 | A | | 6/2016 |
| CN | 105870402 | A | | 8/2016 |
| CN | 107611384 | A | | 1/2018 |
| EP | 3561920 | A1 | | 10/2019 |
| KR | 20080020087 | A | * | 3/2008 |
| KR | 20170063419 | A | | 6/2017 |
| WO | WO-2018117506 | A1 | * | 6/2018 ............ H01M 4/131 |
| WO | WO2018117506 | A1 | | 6/2018 |

OTHER PUBLICATIONS

Contemporary Amperex Technology Co., Limited, International Search Report and Written Opinion, PCT/CN2019/107909, dated Dec. 25, 2019, 12 pgs.
Contemporary Amperex Technology Co., Limited, Supplementary European Search Report, EP19867335, dated Jun. 24, 2021, 2 pgs.
First Patent Search Report, CN201811124179, dated Aug. 19, 2020, 1 pg.

* cited by examiner

POSITIVE ACTIVE MATERIAL AND PREPARATION METHOD THEREOF, ELECTROCHEMICAL BATTERY, BATTERY MODULE, BATTERY PACK, AND APPARATUS

CROSS-REFERENCE TO RELATED APPLICATIONS

This application is a continuation application of PCT Patent Application No. PCT/CN2019/107909, entitled "POSITIVE ELECTRODE ACTIVE MATERIAL AND PREPARATION METHOD THEREFOR, ELECTROCHEMICAL CELL, BATTERY MODULE, BATTERY PACK, AND APPARATUS" filed on Sep. 25, 2019, which claims priority to Chinese Patent Application No. 201811124179.6, filed with the State Intellectual Property Office of the People's Republic of China on Sep. 26, 2018, entitled "POSITIVE ACTIVE MATERIAL AND PREPARATION METHOD THEREOF, AND ELECTROCHEMICAL ENERGY STORAGE APPARATUS", all of which are incorporated herein by reference in their entirety.

TECHNICAL FIELD

This application relates to a positive active material and a preparation method thereof, an electrochemical battery, a battery module, a battery pack, and an apparatus.

BACKGROUND

As a market penetration rate of fuel vehicles increases drastically year by year, not only consumption of non-renewable energy sources such as fossil fuels grows with each passing day, but also environmental pollution and atmospheric pollution are accelerated. Electric vehicles are considered as good alternatives to fuel vehicles. Therefore, an automotive power lithium-ion battery, as a core component of an electric vehicle, has attracted in-depth studies in recent years. In a period as short as about ten years, a positive active material of the power lithium-ion battery has gone through a rapid update from NCM111 to NCM523, NCM622, and NCM811. As nickel content in the positive active material increases substantially, energy density of the power lithium-ion battery has been greatly improved, but this means that content of manganese that stabilizes a structure and content of cobalt that promotes circulation are reduced accordingly, which imposes great challenges on safety performance and cycle life of the power lithium-ion battery. As such, research institutions in various countries have conducted many studies on the NCM811 to improve applicability thereof.

The Chinese Patent Application CN106058230A, filed on Aug. 11, 2016, discloses a method for preparing a high nickel positive electrode material co-modified by aluminum doping and surface modification, where the method includes: mixing a high nickel positive electrode material precursor with an aluminum salt sol; performing evaporation to dryness to obtain a powder; and mixing and sintering the powder with a lithium salt to obtain a high nickel positive electrode material. This method is advantageous in that the high nickel positive electrode material precursor and the aluminum salt are mixed with improved uniformity by using wet coating. However, the subsequent evaporation to dryness requires high energy consumption, and this method cannot effectively reduce content of lithium impurity in the high nickel positive electrode material, which is disadvantageous for improvement of gassing protection performance of a battery.

The Chinese Patent Application CN107611384A, filed on Jan. 19, 2017, discloses a high nickel material with a high-performance concentration gradient, a preparation method thereof and a use thereof in a lithium-ion battery. According to the method, a high nickel precursor with nickel content that gradually increases inwards from the periphery is prepared first, and is then sintered with a lithium salt to obtain a high nickel positive electrode material. The high nickel positive electrode material has higher tap density. However, this does not alleviate cycle performance and gassing problems at a high temperature that are most concerned for a high nickel positive electrode material.

The Chinese Patent Application CN106602021A, filed on Dec. 22, 2016, discloses a coated lithium-ion battery positive electrode material and a preparation method thereof. According to the method, a metal salt is dissolved in deionized water, and after a positive electrode material is added, this mixed solution is stirred, dried, and calcinated, to provide a coated lithium-ion battery positive electrode material that is capable of forming a uniform coating layer on a surface of a high nickel positive electrode material and a preparation method thereof. The synthesized material has low lithium content, but ordinary cycle performance. After 50 cycles, capacity of the material drops from about 190 mAh/g to about 140 mAh/g. The capacity attenuates quickly.

SUMMARY

In view of the problems in the background, this application is intended to provide a positive active material and a preparation method thereof, an electrochemical battery, a battery module, a battery pack, and an apparatus, where the positive active material features high gram capacity, high structural stability, and high thermal stability, so that the electrochemical battery has excellent cycle performance and storage performance and high initial discharge gram capacity.

To achieve the above objective, according to a first aspect of this application, this application provides a positive active material, including an inner core and a coating layer, where the coating layer coats a surface of the inner core. The inner core is selected from a ternary material with a molecular formula of $Li_{1+a}[Ni_xCo_yMn_zM_bM'_c]O_{2-d}Y_d$, where a doping element M is selected from one or more of Zr, Ti, Te, Ca, and Si; a doping element M' is selected from one or more of Mg, Zn, Al, B, Ce, and Fe; a doping element Y is selected from one or more of F, Cl, and Br; $-0.1 \leq a \leq 0.2$, $0 \leq d \leq 0.1$, $0.7 \leq x < 1$, $0 < y < 0.3$, $0 < z < 0.3$, $0 < b \leq 0.1$, $0 < c \leq 0.1$ and $x+y+z+b+c=1$; and distribution of each of the doping elements M, M', and Y in the inner core meets the following condition: there is a reduced mass concentration gradient from an outer side of the inner core to a center of the inner core. The coating layer is made of a material that is an oxide of a coating element M", and the coating element M" is selected from one or more of Mg, Zn, Al, B, Ce, and Fe. A mass ratio of the coating element M" in the coating layer to the doping element M' in the inner core is 1:1 to 1:5.

According to a second aspect of this application, this application provides a method for preparing a positive active material. The method is used to prepare the positive active material according to the first aspect of this application, and includes the following steps: (1) mixing a nickel-cobalt-manganese ternary material precursor, a Li-containing compound, an M-containing compound, an M'-containing compound, and a Y-containing compound in a mixer, and transferring to an atmosphere furnace for primary sintering; (2) washing a material obtained after the primary sintering in the step (1) is completed in a washing solution, and performing centrifugation and vacuum drying to obtain an inner core of the positive active material, that is, the ternary material with a molecular formula $Li_{1+a}[Ni_xCo_yMn_zM_bM'_c]O_{2-d}Y_d$; and (3) mixing the inner core of the positive active material with the M"-containing compound in the mixer, transferring to the atmosphere furnace for secondary sintering, forming a coating layer of the positive active material; and completing preparation of the positive active material.

According to a third aspect of this application, this application provides an electrochemical battery, including the positive active material according to the first aspect of this application.

According to a fourth aspect of this application, this application provides a battery module, including the electrochemical battery according to the third aspect of this application.

According to a fifth aspect of this application, this application provides a battery pack, including the battery module according to the fourth aspect of this application.

According to a sixth aspect of this application, this application provides an apparatus, including the electrochemical battery according to the third aspect of this application, where the electrochemical battery is used as a power supply of the apparatus.

Compared with the prior art, this application has the following beneficial effects:

The positive active material according to this application includes the inner core and the coating layer that coats the surface of the inner core. In the inner core, each of the elements M, M', and Y by which bulk doping is conducted to the ternary material has distribution in the inner core that meets the following condition: there is the reduced mass concentration gradient from the outer side of the inner core to the center of the inner core. The coating layer includes an oxide of the M", and a mass ratio of the coating element M" in the coating layer to the doping element M' in the inner core is 1:1 to 1:5. As such, the positive active material features high gram capacity, high structural stability, and high thermal stability, so that the electrochemical battery has excellent cycle performance and storage performance while having high initial discharge gram capacity.

The battery module, the battery pack, and the apparatus in this application include the electrochemical battery, and therefore have at least similar advantages as the electrochemical battery.

Figure 1:
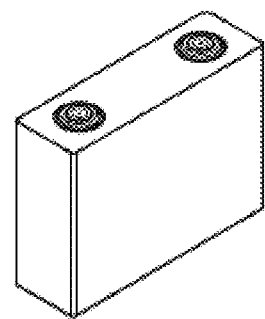
FIG. 1 is a perspective view of an embodiment of a electrochemical battery.

Description of Reference Signs:
1. battery pack;
2. upper box body;
3. lower box body;
4. battery module;
5. electrochemical battery;
51. housing;
52. electrode assembly;
521. first electrode plate;
521a. first current collector;
521b. first active material layer;
522. second electrode plate;
522a. second current collector;
522b. second active material layer;
523. separator;
524. first tab;
525. second tab; and
53. top cover assembly.

DESCRIPTION OF EMBODIMENTS

The following describes in detail a positive active material and a preparation method thereof, an electrochemical battery, a battery module, a battery pack, and an apparatus according to this application.

The following first describes the positive active material according to the first aspect of this application, including an inner core and a coating layer, where the coating layer coats a surface of the inner core. The inner core is selected from a ternary material with a molecular formula of $Li_{1+a}[Ni_xCo_yMn_zM_bM'_c]O_{2-d}Y_d$, where a doping element M is selected from one or more of Zr, Ti, Te, Ca, and Si; a doping element M' is selected from one or more of Mg, Zn, Al, B, Ce, and Fe; a doping element Y is selected from one or more of F, Cl, and Br; $-0.1 \leq a \leq 0.2$, $0 \leq d \leq 0.1$, $0.7 \leq x < 1$, $0 < y < 0.3$, $0 < z < 0.3$, $0 < b \leq 0.1$, $0 < c \leq 0.1$ and $x+y+z+b+c=1$; and distribution of each of the doping elements M, M', and Y in the inner core meets the following condition: there is a reduced mass concentration gradient from an outer side of the inner core to a center of the inner core. The coating layer is made of a material that is an oxide of a coating element M", and the coating element M" is selected from one or more of Mg, Zn, Al, B, Ce, and Fe. A mass ratio of the coating element M" in the coating layer to the doping element M' in the inner core is 1:1 to 1:5.

An electrochemical battery has initial discharge gram capacity, cycle performance, and storage performance closely related to physical and chemical properties of the positive active material. In the ternary material, Ni, Co, and Mn are transition metal elements that are adjacent with each other in the same period of element. As a ratio of the three elements changes, the physical and chemical properties of the ternary material also change. Ni is generally considered as one of main active metal components in the ternary material and mainly exists in a form of +2 valence. During deintercalation of lithium, $Ni^{2+}$ is oxidized to $Ni^{3+}$ or $Ni^{4+}$. Co is also one of the active metal components, and mainly exists in a form of +3 valence. During deintercalation of lithium, $Co^{3+}$ is oxidized to $Co^{4+}$. Mn is electrochemically inert and mainly exists in a form of +4 valence. Therefore, during deintercalation of lithium of an electrochemical battery, the ternary material achieves charge balance mainly through changes in valence states of Ni and Co.

In the ternary material, higher Ni content leads to higher gram capacity of the ternary material, which facilitates an increase in the initial discharge gram capacity of the electrochemical battery. However, when the Ni content is higher, $Ni^{2+}$ and $Li^+$ are likely mixed. A reason lies in that $Ni^{2+}$ and $Li^+$ have close radii. During deintercalation of lithium, $Ni^{2+}$ is more likely to migrate to a vacancy formed by deintercalation of $Li^+$, leading to precipitation of Li. During repeated charging and discharging, a mixing ratio of $Ni^{2+}$ to $Li^+$ keeps increasing, and a layered structure of the ternary material may collapse, which makes deintercalation of $Li^+$ in the layered structure of the ternary material more difficult, and ultimately leads to deterioration of the cycle performance of the electrochemical battery. In addition, the increase of the Ni content in the ternary material also reduces a thermal decomposition temperature of the ternary material, resulting in an increase of heat output, which further undermines thermal stability of the ternary material. In addition, when the Ni content in the ternary material increases, content of $Ni^{4+}$ with strong oxidization also increases. When an electrolyte contacts the ternary material, the electrolyte has more side reactions with the ternary material, and to maintain the charge balance, the ternary material releases oxygen, which not only breaks a crystal structure of the ternary material, but also accelerates gassing of the electrochemical battery and deteriorates the storage performance of the electrochemical battery. Co may effectively stabilize the layered structure of the ternary material, inhibit the mixing of lithium and nickel, improve electronic conductivity of the ternary material, improve the cycle performance of the electrochemical battery, but Co is more expensive. The existence of Mn may improve structural stability and safety performance of the ternary material, and may reduce costs of the ternary material. However, if content of Mn is too high, a spinel phase may appear and breaks the layered structure of the ternary material. This reduces the gram capacity of the ternary material, and deteriorates the cycle performance of the electrochemical battery.

From the perspective of a ternary material, to obtain a ternary material with high gram capacity and low costs, relative content of Ni may be increased while relative contents of Co and Mn may be reduced. In this case, the ternary material may have higher gram capacity, but poor structural stability. From the perspective of an electrochemical battery, increasing the relative content of Ni and reducing the relative contents of Co and Mn may increase the initial discharge gram capacity of the electrochemical battery, but may deteriorate the cycle performance and the storage performance.

The positive active material of this application has a core-shell structure, where the inner core is a bulk-doped ternary material, with a molecular formula of $Li_{1+a}[Ni_x Co_y Mn_z M_b M'_c]O_{2-d}Y_d$, higher relative content of Ni, and lower relative content of Co and Mn, so that the positive active material may have an advantage of high gram capacity. However, the ternary material with high Ni content inevitably has reduced thermal stability and structural stability, thereby inevitably deteriorating the cycle performance and the storage performance of the electrochemical battery.

By performing bulk doping for the ternary material of the inner core with M and M' as cationic doping elements, the thermal stability and structural stability of the ternary material may be significantly improved. A possible reason is that the doping elements M and M' may change a lattice constant of the ternary material or the valence states of some elements in the ternary material, reduce relative content of $Ni^{4+}$ on surfaces of ternary material particles, and significantly increase the thermal stability and structural stability of the ternary material, while improving the electronic conductivity and ionic conductivity of the ternary material, reducing the mixing of lithium and nickel in the ternary material, and further achieving the purpose of improving the cycle performance of the electrochemical battery. In an example of the bulk doping of the doping element Al, $Al^{3+}$ may inhibit mixing of $Ni^{2+}$ and $Li^+$, thereby inhibiting phase transformation of the ternary material during charging and discharging, improving the structural stability of the ternary material, and effectively improving the cycle performance of electrochemical battery.

Furthermore, in the bulk doping performed for the ternary material of the inner core with Y as an anion doping element, the doping element Y may substitute a part of $O^{2-}$. In addition, as the doping element Y is a halogen, and chemical bond energy between a halogen and a transition metal (such as Ni, Co, and Mn) is higher than chemical bond energy of oxygen and a transition metal. This further facilitates improvement of the thermal stability and structural stability of the ternary material, and alleviates corrosion of the ternary material by HF in the electrolyte. Preferably, the doping element Y is F.

In addition, progressive decreasing mass concentration gradient distribution of the doping elements M, M', and Y in the ternary material may also ensure more continuous and stable improvement of the thermal stability and structural stability of the ternary material.

Coating the ternary material with an oxide of the coating element M" as a coating material may further prevent the ternary material from directly contacting the electrolyte, without imposing any hindrance on the normal intercalation and deintercalation of lithium ions, thereby significantly reducing a probability of side reactions between the ternary material and the electrolyte that cause the electrolyte to oxidize and decompose, and reducing an amount of oxygen released by the ternary material for charge balance during charging and discharging and the risk of collapse of the crystal structure caused by this. In addition, improvement of surface performance of the ternary material by the coating layer may also reduce heat generation during charging and discharging. In addition, the existence of the coating layer may also inhibit the phase transformation of the ternary material, thereby further improving the structural stability of the ternary material.

If optimization of each of Ni, Co, Mn, the doping elements M, M', Y, and the coating element M" in the ternary material is only considered individually, much limitation is imposed on the high gram capacity, high structural stability, and high thermal stability of the positive active material. In the design of the positive active material in this application, the content of Ni, Co, Mn, the distribution and content of the doping elements M, M', and Y, and the distributions and contents of the coating element M" are considered comprehensively. When $-0.1 \leq a \leq 0.2$, $0 \leq d \leq 0.1$, $0.7 \leq x < 1$, $0 < y < 0.3$, $0 < z < 0.3$, $0 < b \leq 0.1$, $0 < c \leq 0.1$ and $x+y+z+b+c=1$ are met, and when the mass ratio of the coating element M" in the coating layer to the doping element M" in the inner core is 1:1 to 1:5, the positive active material may feature the high gram capacity, high structural stability, and high thermal stability, so that the electrochemical battery may have the high initial discharge gram capacity and excellent cycle performance and storage performance.

Preferably, the mass ratio of the coating element M" in the coating layer to the doping element M' in the inner core is 1:1 to 1:3.

In the positive active material according to the first aspect of this application, preferably, within a thickness range from an outermost side of the positive active material (that is, an outer surface of the coating layer) to a ⅕ average particle size of the positive active material in a direction towards the inner core, a sum of masses of M, M', Y, and M" in this thickness range is more than 50%, preferably more than 55%, of a total mass of M, M', Y, and M" in the positive active material. The foregoing structure may ensure that total content of modified elements (including the doping elements M, M', Y and the coating element M") in a surface layer of the positive active material is not too low, so that the positive active material features the high structural stability and high thermal stability, and the electrochemical battery features excellent cycle performance. The foregoing structure may also ensure that the content of strong oxidizing nickel in the positive active material is low, thereby reducing the side reactions of the positive active material (especially the inner core of the ternary material) with the electrolyte, and effectively suppressing gas build-up. In addition, the foregoing structure may also ensure that the obtained positive active material has good electronic conductivity and ionic conductivity, thereby providing rather low DC impedance of the electrochemical battery.

More specifically, in the thickness range from the outermost side of the positive active material (that is, an outer surface of the coating layer) to a ⅔ average particle size of the positive active material in the direction towards the inner core, the sum of the masses of M, M', Y, and M" in this thickness range is more than 90%, preferably more than 93%, of the total mass of M, M', Y, and M" in the positive active material. If the doping elements M, M', and Y diffuse too deep, or have too wide radial concentration distribution in the inner core, an improvement effect on the structural stability and thermal stability of the surface layer of the positive active material may not be obvious, or an improvement effect of reducing the content of strong oxidizing nickel may not be obvious, and the crystal structures inside the positive active material particles may also be distorted, thereby affecting capacity development.

In the positive active material according to the first aspect of this application, types of the coating element M" in the coating layer and the doping element M" in the inner core may be the same or different. Such types are not specifically restricted herein, and may be selected depending on an actual need. Preferably, the types the coating element M" in the coating layer and the doping element M" in the inner core are the same. This facilitates the intercalation and deintercalation of lithium ions, thereby further facilitating the performance development of the electrochemical battery.

In the positive active material according to the first aspect of this application, when a mass concentration of the doping element M in the inner core is low, the thermal stability and structural stability of the inner core may not be effectively improved. Particularly, the improvement of the thermal stability is weak. Therefore, the cycle performance of the electrochemical battery may not be effectively improved. When the mass concentration of the doping element M in the inner core is high, the gram capacity of the positive active material decreases significantly, which is unfavorable to the initial discharge gram capacity of the electrochemical battery. Therefore, preferably, based on total mass of the positive active material, the mass concentration of the doping element M in the inner core is 100 ppm to 3000 ppm.

In the positive active material according to the first aspect of this application, when a mass concentration of the doping element M in the inner core is low, the thermal stability and structural stability of the inner core may not be effectively improved. Particularly, the improvement of the structural stability is weak. Therefore, the cycle performance of the electrochemical battery may not be effectively improved. When the mass concentration of the doping element M in the inner core is high, the gram capacity of the positive active material decreases significantly, which is unfavorable to the initial discharge gram capacity of the electrochemical battery. Therefore, preferably, based on total mass of the positive active material, a mass concentration of the doping element M' in the inner core is 100 ppm to 3000 ppm.

In the positive active material according to the first aspect of this application, when a mass concentration of the doping element Y in the inner core is high, the gram capacity of the positive active material decreases significantly, which is unfavorable to the initial discharge gram capacity of the electrochemical battery. Therefore, preferably, based on total mass of the positive active material, the mass concentration of the doping element Y in the inner core is 0 ppm to 5000 ppm. The mass concentration 0 of the doping element Y in the inner core indicates that the element Y may not be doped in the inner core.

In the positive active material according to the first aspect of this application, when a mass concentration of the coating element M" in the coating layer is low, the coating layer formed is usually thin, and may not effectively prevent the direct contact between the inner core and the electrolyte, so that the gas production may not be sufficiently suppressed. When the mass concentration of the coating element M" in the coating layer is increased, the coating layer formed is thicker, intercalation and deintercalation of lithium ions may be hindered to some extent, and the gram capacity development of the positive active material is poor. This great affects the performance of the electrochemical battery. Therefore, preferably, based on total mass of the positive active material, the mass concentration of the coating element M" in the coating layer is 100 ppm to 3000 ppm.

In the positive active material according to the first aspect of this application, a thicker coating layer leads to greater hindrance to the intercalation and deintercalation of lithium ions, worse gram capacity development of the positive active material, and greater impact on the performance of the electrochemical battery. A thinner coating layer leads to a less obvious coating modification effect. Therefore, the direct contact between the inner core and the electrolyte may not be effectively prevented, and thus the gas production may not be sufficiently inhibited. As such, preferably, a thickness T of the coating layer is 0.001 μm to 0.5 μm. More specifically, the thickness T of the coating layer is 0.001 μm to 0.2 μm. Within the foregoing preferred range, the positive active material may effectively feature high gram capacity, high structural stability, and high thermal stability, and thus may better improve the performance of the electrochemical battery.

In the positive active material according to the first aspect of this application, preferably, the average particle size D50 of the positive active material is 8 μm to 20 μm. Within the foregoing preferred range, a positive electrode plate may have higher uniformity, which may not only prevent the performance of the electrochemical battery from being affected by too many side reactions between the positive electrode plate and the electrolyte because particle sizes are too small, but also prevent transmission of lithium ions inside the particles from being blocked and the performance of electrochemical battery from being affected because particle sizes are too large.

In the positive active material according to the first aspect of this application, further preferably, the thickness T of the coating layer and the average particle size D50 of the positive active material meet the following condition: 0.005≤T/D50≤0.02.

In the positive active material according to the first aspect of this application, preferably, a concentration of the lithium impurity in the positive active material is less than or equal to 1500 ppm. More specifically, the concentration of the lithium impurity in the positive active material is 700 ppm to 1500 ppm. The lithium impurity in the positive active material mainly includes an alkaline lithium compound in a form of lithium hydroxide and lithium carbonate. The existence of the lithium impurity not only may affect processing performance of the positive electrode plate, but also may affect high-temperature performance and safety performance of the electrochemical battery. Possible reasons may be as follows. The lithium impurity mainly includes an alkaline lithium compound. When content of lithium impurity in the positive active material increases, a pH value of the positive active material also increases. This makes a positive electrode slurry become viscous or even gelatinous in the presence of a small amount of water, thereby affecting the processing performance of the positive electrode plate. In addition, the lithium impurity may decompose under a high temperature condition, leading to the gassing of the electrochemical battery. This deteriorates the high-temperature performance and safety performance of the electrochemical battery. The positive active material of this application has a core-shell structure. The ternary material of the inner core is doped with doped elements (including cation doping, or cation and anion mixed doping). The positive active material may feature high thermal stability and structural stability, and may reduce the content of the lithium impurity in the positive active material to some extent. In addition, the existence of the coating layer may also reduce the content of the lithium impurity in the positive active material to some extent. As such, the positive active material of this application may have a lower concentration of lithium impurity, thereby ensuring that the positive electrode plate has better processing performance, and that the electrochemical battery has better high-temperature performance and safety performance.

Moreover, the following describes the method for preparing a positive active material according to the second aspect of this application. The method is used to prepare the positive active material according to the first aspect of this application, and includes the following steps:

(1) mixing a nickel-cobalt-manganese ternary material precursor, a Li-containing compound, an M-containing compound, an M'-containing compound, and a Y-containing compound in a mixer, and transferring to an atmosphere furnace for primary sintering;

(2) washing a material obtained after the primary sintering in step (1) is completed in a washing solution, and performing centrifugation and vacuum drying to obtain an inner core of the positive active material, that is, the ternary material with a molecular formula $Li_{1+a}[Ni_xCo_yMn_zM_bM'_c]O_{2-d}Y_d$; and (3) mixing the inner core of the positive active material with the M"-containing compound in the mixer, transferring to the atmosphere furnace for secondary sintering, forming a coating layer of the positive active material, and completing preparation of the positive active material.

In the preparation method according to the second aspect of this application, the primary sintering performed for the nickel-cobalt-manganese ternary material precursor, the Li-containing compound, the M-containing compound, the M'-containing compound, and the Y-containing compound may obtain the ternary material with reduced mass concentration gradients of doping elements M, M', and Y from surfaces of particles to the inside of particles. Washing the ternary material with the washing solution may significantly reduce content of the lithium impurity on a surface of the ternary material. The secondary sintering performed for the washed and dried ternary material with the M" compound may obtain the positive active material that is coated with an M" oxide and bulk doped with M, M', and Y.

In step (1), the nickel-cobalt-manganese ternary material precursor may be of a nickel-cobalt-manganese oxide or a nickel-cobalt-manganese hydroxide, where the nickel-cobalt-manganese oxide and the nickel-cobalt-manganese hydroxide may be synthesized through a conventional re-drying method or co-precipitation.

In step (1), a type of the Li-containing compound is not specifically limited, and may be selected depending on an actual need. Preferably, the lithium-containing compound may be lithium hydroxide, lithium carbonate, lithium nitrate, and the like.

In step (1), types of the M-containing compound and the M'-containing compound are not specifically limited, and may be selected depending on an actual need. Preferably, the M-containing compound may be selected from an M oxide, an M chloride, an M sulfate, an M nitrate, an M carbonate, an M bicarbonate, and the like. The M'-containing compound may be selected from an M' oxide, an M' chloride, an M' sulfate, an M' nitrate, an M' carbonate, and an M' bicarbonate, and the like.

In step (1), a type of the Y-containing compound is also not specifically limited, and may be selected depending on an actual need. Preferably, the Y-containing compound may be selected from an ammonium salt of Y or a lithium salt of Y. For example, the Y-containing compound may be $NH_4F$, $NH_4Cl$, $NH_4Br$, LiF, LiCl, LiBr, and the like.

In step (1), mixing duration is not specifically limited and may be selected depending on an actual need, provided that the nickel-cobalt-manganese ternary material precursor, the Li-containing compound, the M-containing compound, the M'-containing compound, and the Y-containing compound are mixed uniformly. Preferably, the mixing duration is 0.5 h to 3 h.

In step (1), primary sintering atmosphere in the atmosphere furnace may be air or oxygen. Preferably, the primary sintering atmosphere is oxygen. More specifically, an oxygen concentration in the atmosphere furnace is 50% to 100%. Further preferably, the oxygen concentration in the atmosphere furnace is 80% to 100%.

In step (1), preferably, a primary sintering temperature is 700° C. to 950° C.

In step (1), preferably, primary sintering duration is 5 h to 25 h. More specifically, the primary sintering duration is 10 h to 20 h.

In step (2), the washing solution may be deionized water or a boron-containing compound solution. A solvent in the boron-containing compound solution may be deionized water, ethanol, or a mixed solvent thereof. A boron-containing compound in a solute may be selected from one or more of $B_2O_3$, $H_3BO_3$, $C_6H_5B(OH)_2$, $C_3H_9B_3O_6$, and $(C_3H_7O)_3B$. Preferably, a concentration of the boron-containing compound solution may be 0.01 mol/L to 1 mol/L.

In step (2), preferably, a washing temperature is 10° C. to 50° C. More specifically, the washing temperature is 20° C. to 40° C. Preferably, washing duration is 1 min to 60 min. More specifically, the washing duration is 2 min to 30 min. Preferably, an agitation speed in the washing is 10 r/min to 500 r/min. More specifically, the agitation speed is 20 r/min to 200 r/min.

In step (2), to achieve a better washing effect, preferably, a mass ratio of the material obtained after the primary sintering is completed to the washing solution is 1:0.5 to 1:10. More specifically, the mass ratio is 1:1 to 1:5.

In step (2), preferably, a vacuum drying temperature is 80° C. to 150° C. More specifically, the vacuum drying temperature is 90° C. to 120° C. Preferably, vacuum drying duration is 2 h to 20 h. More specifically, the vacuum drying duration is 5 h to 10 h.

In step (3), a type of the M"-containing compound is not specifically limited, and may be selected depending on an actual need. Preferably, the M"-containing compound may be selected from an M" oxide, an M" chloride, an M" sulfate, an M" nitrate, an M" carbonate, an M" bicarbonate, and the like.

In step (3), the mixing duration is not specifically limited and may be selected depending on an actual need, provided that the inner core of the positive active material and the M"-containing compound are mixed uniformly. Preferably, the mixing duration is 0.5 h to 3 h.

In step (3), secondary sintering atmosphere in the atmosphere furnace may be air or oxygen. Preferably, the secondary sintering atmosphere is oxygen. More specifically, the oxygen concentration in the atmosphere furnace is 50% to 100%. Further preferably, an oxygen concentration in the atmosphere furnace is 80% to 100%.

In step (3), preferably, a secondary sintering temperature is 200° C. to 500° C.

In step (3), preferably, secondary sintering duration is 5 h to 25 h. More specifically, the secondary sintering duration is 5 h to 10 h.

It should be noted that in the foregoing steps (1) and (3), the types of the M'-containing compound and the M"-containing compound may be the same or different, and may be selected depending on an actual need. Preferably, the type of the M'-containing compound in step (1) is the same as that of the M"-containing compound in step (3).

Next, the following describes the electrochemical battery according to the third aspect of this application.

Figure 2:
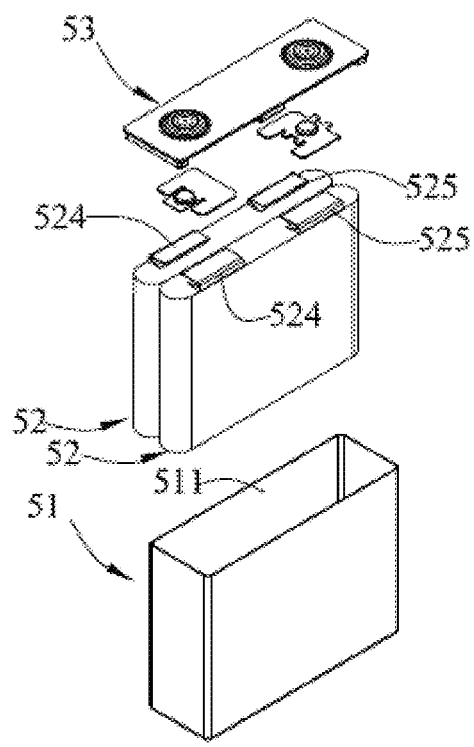
FIG. 2 is an exploded view of FIG. 1.
Figure 3:
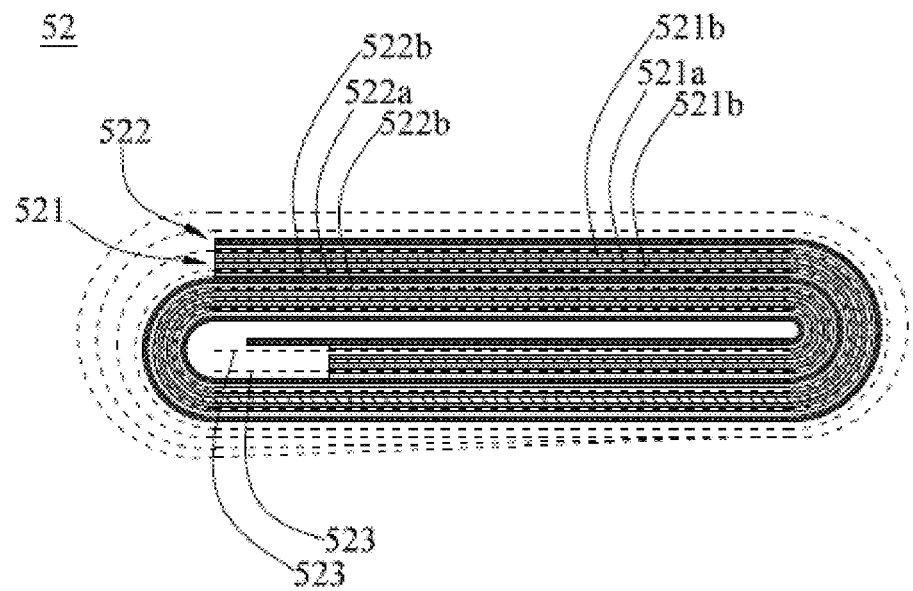
FIG. 3 is a schematic diagram of an embodiment of an electrode assembly of the electrochemical battery in FIG. 2, where a first electrode plate, a second electrode plate, and a separator are wound to form a wound electrode assembly.
Figure 4:
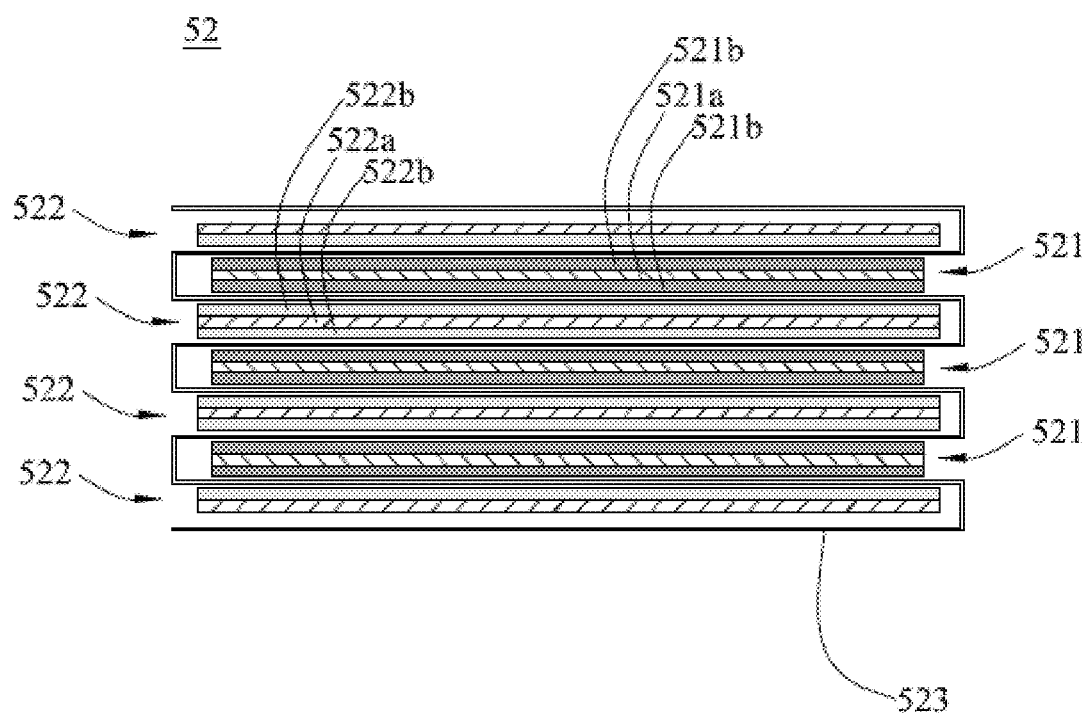
FIG. 4 is a schematic diagram of another embodiment of an electrode assembly of the electrochemical battery in FIG. 2, where a first electrode plate, a second electrode plate, and a separator are stacked along a thickness direction to form a stacked electrode assembly.

FIG. 1 is a perspective view of an embodiment of a electrochemical battery 5. FIG. 2 is an exploded view of FIG. 1. FIG. 3 is a schematic diagram of an embodiment of an electrode assembly 52 of the electrochemical battery 5 in FIG. 2, where a first electrode plate 521, a second electrode plate 522, and a separator 523 are wound to form a wound electrode assembly. FIG. 4 is a schematic diagram of another embodiment of an electrode assembly 52 of the electrochemical battery 5 in FIG. 2, where a first electrode plate 521, a second electrode plate 522, and a separator 523 are stacked along a thickness direction to form a stacked electrode assembly.

With reference to FIG. 1 to FIG. 4, the electrochemical battery 5 includes a housing 51, the electrode assembly 52, a top cover assembly 53, and an electrolyte (not shown).

The electrode assembly 52 is accommodated in the housing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b provided on a surface of the first current collector 521a. The first active material layer 521b contains a first active material. The first active material layer 521b may be provided on one surface or two surfaces of the first current collector 521a depending on an actual need. The second electrode plate 522 includes a second current collector 522a and a second active material layer 522b provided on a surface of the second current collector 522a. The second active material layer 522b may be provided on one surface or two surfaces of the second current collector 522a depending on an actual need. The second active material layer 522b contains a second active material. The first active material and the second active material realize deintercalation of active ions (for example, lithium ions for a lithium-ion battery). Electric polarities of the first electrode plate 521 and the second electrode plate 522 are opposite. To be specific, one of the first electrode plate 521 and the second electrode plate 522 is a positive electrode plate, and the other of the first electrode plate 521 and the second electrode plate 522 is a negative electrode plate. The first tab 524 may be formed by cutting the first current collector 521a, or may be formed separately, and is fixedly connected to the first current collector 521a. Similarly, the second tab 525 may be formed by cutting the second current collector 522a, or may be formed separately, and is fixedly connected to the second current collector 522a.

A quantity of the electrode assemblies 52 is not limited, and may be one or more.

The electrolyte is injected into the housing 51 and impregnates the electrode assembly 52. Specifically, the electrolyte impregnates the first electrode plate 521, the second electrode plate 522, and the separator 523.

It is noted that the electrochemical battery 5 shown in FIG. 1 is a tank type battery, but is not limited thereto. The electrochemical battery 5 may be a bag type battery, which means that the housing 51 is replaced by a metal plastic film and the top cover assembly 53 is eliminated.

In the electrochemical battery 5, as one of the first electrode plate 521 and the second electrode plate 522 is the positive electrode plate, a current collector of the positive electrode plate is a positive current collector, an active material layer of the positive electrode plate is a positive active material layer, and an active material of the positive electrode plate is a positive active material. As such, the positive electrode plate includes the positive current collector and the positive active material layer provided on the positive current collector, and the positive active material layer includes the positive active material according to the first aspect of this application. In the electrochemical battery according to the third aspect of this application, a type of the separator is not specifically limited, and the separator may be, but is not limited to, any separator material used in existing electrochemical batteries, for example, polyethylene, polypropylene, polyvinylidene fluoride, and a multi-layer composite film thereof.

In the electrochemical battery according to the third aspect of this application, a specific type and composition of the electrolyte are not specifically limited, and may be selected depending on an actual need.

It should be noted that the electrochemical battery may be a lithium-ion battery, a metal lithium battery, an all-solid-state lithium battery, or a super capacitor. In the embodiments of this application, only an embodiment in which the electrochemical battery is a lithium-ion battery is shown, but this application is not limited thereto.

Next, the following describes the battery module according to the fourth aspect of this application.

Figure 5:
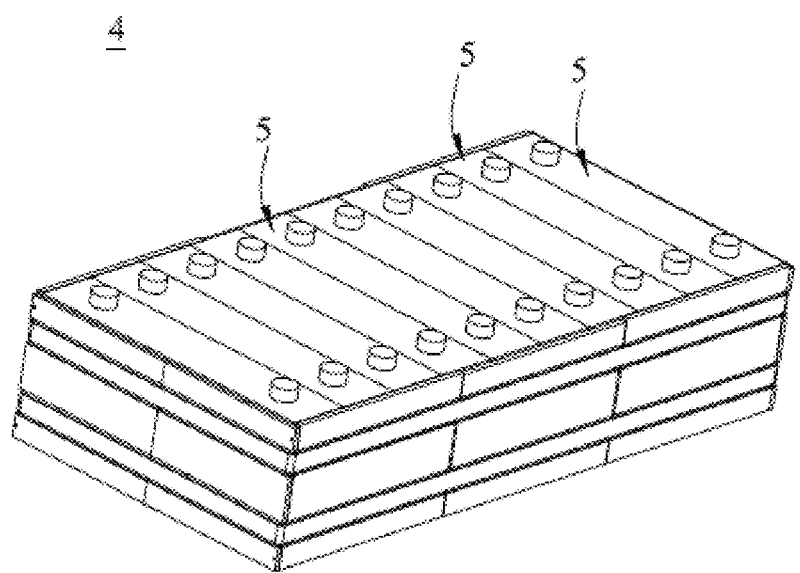
FIG. 5 is a perspective view of an embodiment of a battery module.

FIG. 5 is a perspective view of an embodiment of a battery module 4. Referring to FIG. 5, the battery module 4 includes a plurality of electrochemical batteries 5. The plurality of electrochemical batteries 5 are arranged in a longitudinal direction. The battery module 4 may be used as a power supply or an energy storage apparatus.

The battery module 4 provided in the fourth aspect of this application includes the electrochemical battery 5 according to the third aspect of this application. The quantity of electrochemical batteries 5 included in the battery module 4 may be adjusted based on an application and capacity of the battery module 4.

Next, the following describes the battery pack according to the fifth aspect of this application.

Figure 6:
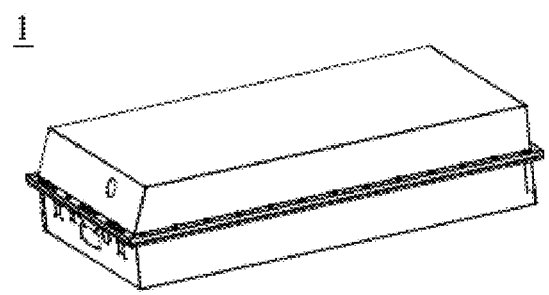
FIG. 6 is a perspective view of an embodiment of a battery pack.
Figure 7:
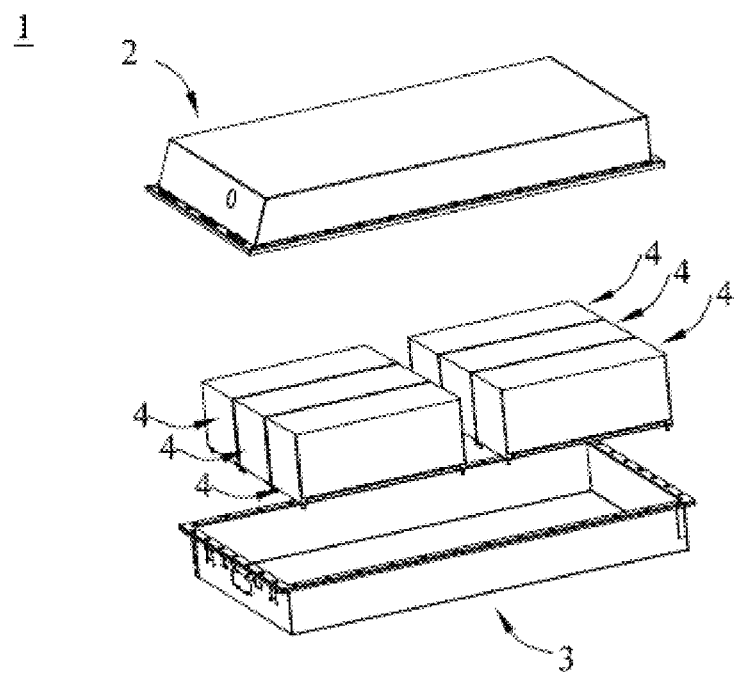
FIG. 7 is an exploded view of FIG. 6.

FIG. 6 is a perspective view of an embodiment of a battery pack 1. FIG. 7 is an exploded view of FIG. 6.

Referring to FIG. 6 and FIG. 7, the battery pack 1 includes an upper box body 2, a lower box body 3, and the battery module 4. The upper box body 2 and the lower box body 3 are assembled together to form space for accommodating the battery module 4. The battery module 4 is disposed in the space formed by the upper box body 2 and the lower box body 3 that are assembled together. An output electrode of the battery module 4 penetrates through one or both of the upper box body 2 and the lower box body 3 to output power or to charge from an outer source. A quantity and an arrangement of the battery modules 4 used in the battery pack 1 may be determined depending on an actual need. The battery pack 1 may be used as a power supply or an energy storage apparatus.

The battery pack provided in the fifth aspect of this application includes the battery module 4 according to the fourth aspect of this application.

Figure 8:
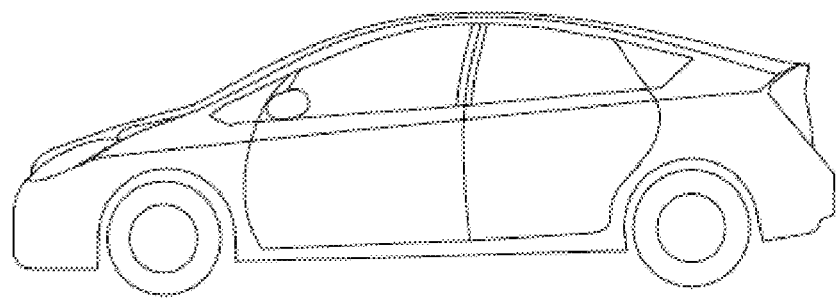
FIG. 8 is a schematic diagram of an embodiment of an apparatus using an electrochemical battery as a power supply.

FIG. 8 is a schematic diagram of an embodiment of an apparatus using an electrochemical battery as a power supply.

The apparatus provided in the sixth aspect of this application includes the electrochemical battery 5 according to the third aspect of this application, where the electrochemical battery is used as a power supply of the apparatus. In FIG. 8, the apparatus using the electrochemical battery 5 is an electric automobile. The electrochemical battery 5 may be used as a power supply of the apparatus. The apparatus using the electrochemical battery 5 is obviously not limited to this, and may be any electric vehicle in addition to an electric automobile (such as an electric bus, an electric tram, an electric bicycle, an electric motorcycle, an electric scooter, an electric golf cart, and an electric truck), an electric vessel, an electric tool, an electronic device, and an energy storage system. The electric automobile may be a battery electric vehicle, a hybrid electric vehicle, or a plug-in hybrid electric vehicle. Certainly, depending on an actual use form, the apparatus provided in the sixth aspect of this application may include the battery module 4 according to the fourth aspect of this application. Certainly, the apparatus provided in the sixth aspect of this application may alternatively include the battery pack 1 according to the fifth aspect of this application.

The following further describes this application with reference to the embodiments by using a lithium-ion battery as an example. It should be understood that these embodiments are merely intended to describe this application but not to limit the scope of this application.

EMBODIMENT 1

(1) Raw Material Preparation

A ternary material precursor was $[Ni_{0.8}Co_{0.1}Mn_{0.1}](OH)_2$ with a mass of 4300 g.

A Li-containing compound was lithium hydroxide ($LiOH.H_2O$) with a mass of 2035 g.

An M-containing compound was titanium dioxide ($TiO_2$).

An M'-containing compound was alumina trioxide ($Al_2O_3$).

An M"-containing compound was alumina trioxide ($Al_2O_3$).

Based on total mass of the foregoing raw materials, a mass concentration of an element M in an inner core was 100 ppm, a mass concentration of an element M' in the inner core was 2000 ppm, and a mass concentration of an element M" in a coating layer was 1500 ppm.

(2) Preparation Process

The ternary material precursor $[Ni_{0.8}Co_{0.1}Mn_{0.1}](OH)_2$, lithium hydroxide ($LiOH.H_2O$), titanium dioxide ($TiO_2$), and alumina trioxide ($Al_2O_3$) were placed in a high-speed mixer for mixing for 1 hour, and a mixed material was transferred to an atmosphere sintering furnace with an $O_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $Al_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅓ average particle size of the positive active material in a direction towards the inner core, a sum of mass concentrations of an element Ti and an element Al was 2160 ppm, and a ratio $w_1$ of masses of the element Ti and the element Al to a total mass of the element Ti and the element Al in the positive active material was 60%; and within a thickness range from the outermost side of the positive active material to a ⅔ average particle size of the positive active material in the direction towards the inner core, a sum of mass concentrations of an element Ti and an element Al was 3348 ppm, and a ratio $w_2$ of masses of the element Ti and the element Al to a total mass of the element Ti and the element Al in the positive active material was 93%.

EMBODIMENT 2

(1) Raw Material Preparation

A ternary material precursor was $[Ni_{0.8}Co_{0.1}Mn_{0.1}](OH)_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

Based on total mass of the foregoing raw materials, a mass concentration of an element M in an inner core was 1500 ppm, a mass concentration of an element M' in the inner core was 2000 ppm, and a mass concentration of an element M" in a coating layer was 1500 ppm.

(2) Preparation Process

The ternary material precursor [Ni$_{0.8}$Co$_{0.1}$Mn$_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and Al$_2$O$_3$ were placed in the high-speed mixer for mixing for 2 hours, and a mixed material was placed in the atmosphere sintering furnace with an O$_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 3000 ppm, and a ratio w$_1$ of masses of the element Ti and the element Al to a total mass of the element Ti and the element Al in the positive active material was 60%; and within a thickness range from the outermost side of the positive active material to a ⅔ average particle size of the positive active material in the direction towards the inner core, a sum of mass concentrations of an element Ti and an element Al was 4650 ppm, and a ratio w$_2$ of masses of the element Ti and the element Al to a total mass of the element Ti and the element Al in the positive active material was 93%.

EMBODIMENT 3

(1) Raw Material Preparation

A ternary material precursor was [Ni$_{0.8}$Co$_{0.1}$Mn$_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

Based on total mass of the foregoing raw materials, a mass concentration of an element M in an inner core was 3000 ppm, a mass concentration of an element M' in the inner core was 2000 ppm, and a mass concentration of an element M" in a coating layer was 1500 ppm.

(2) Preparation Process

The ternary material precursor [Ni$_{0.8}$Co$_{0.1}$Mn$_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and Al$_2$O$_3$ were placed in the high-speed mixer for mixing for 2 hours, and a mixed material was placed in the atmosphere sintering furnace with an O$_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 3900 ppm, and a ratio w$_1$ of masses of the element Ti and the element Al to a total mass of the element Ti and the element Al in the positive active material was 60%; and within a thickness range from the outermost side of the positive active material to a ⅔ average particle size of the positive active material in the direction towards the inner core, a sum of mass concentrations of an element Ti and an element Al was 6045 ppm, and a ratio w$_2$ of masses of the element Ti and the element Al to a total mass of the element Ti and the element Al in the positive active material was 93%.

EMBODIMENT 4

(1) Raw Material Preparation

A ternary material precursor was [Ni$_{0.8}$Co$_{0.1}$Mn$_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

Based on total mass of the foregoing raw materials, a mass concentration of an element M in an inner core was 1500 ppm, a mass concentration of an element M' in the inner core was 100 ppm, and a mass concentration of an element M" in a coating layer was 100 ppm.

(2) Preparation Process

The ternary material precursor [$Ni_{0.8}Co_{0.1}Mn_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and Al$_2$O$_3$ were placed in the high-speed mixer for mixing for 2 hours, and a mixed material was placed in the atmosphere sintering furnace with an O$_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 1020 ppm, and a ratio $w_1$ of masses of the element Ti and the element Al to a total mass of the element Ti and the element Al in the positive active material was 60%; and within a thickness range from the outermost side of the positive active material to a ⅔ average particle size of the positive active material in the direction towards the inner core, a sum of mass concentrations of an element Ti and an element Al was 1581 ppm, and a ratio $w_2$ of masses of the element Ti and the element Al to a total mass of the element Ti and the element Al in the positive active material was 93%.

EMBODIMENT 5

(1) Raw Material Preparation

A ternary material precursor was [$Ni_{0.8}Co_{0.1}Mn_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

Based on total mass of the foregoing raw materials, a mass concentration of an element M in an inner core was 1500 ppm, a mass concentration of an element M' in the inner core was 1500 ppm, and a mass concentration of an element M" in a coating layer was 1500 ppm.

(2) Preparation Process

The ternary material precursor [$Ni_{0.8}Co_{0.1}Mn_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and Al$_2$O$_3$ were placed in the high-speed mixer for mixing for 2 hours, and a mixed material was placed in the atmosphere sintering furnace with an O$_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 2700 ppm, and a ratio $w_1$ of masses of the element Ti and the element Al to a total mass of the element Ti and the element Al in the positive active material was 60%; and within a thickness range from an outermost side of the positive active material to a ⅔ average particle size of the positive active material in the direction towards the inner core, a sum of mass concentrations of an element Ti and an element Al was 4185 ppm, and a ratio $w_2$ of masses of the element Ti and the element Al to a total mass of the element Ti and the element Al in the positive active material was 93%.

EMBODIMENT 6

(1) Raw Material Preparation

A ternary material precursor was [$Ni_{0.8}Co_{0.1}Mn_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

Based on total mass of the foregoing raw materials, a mass concentration of an element M in an inner core was 1500 ppm, a mass concentration of an element M' in the inner core was 3000 ppm, and a mass concentration of an element M" in a coating layer was 3000 ppm.

(2) Preparation Process

The ternary material precursor [$Ni_{0.8}Co_{0.1}Mn_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $Al_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 4500 ppm, and a ratio $w_1$ of masses of the element Ti and the element Al to a total mass of the element Ti and the element Al in the positive active material was 60%; and within a thickness range from an outermost side of the positive active material to a ⅔ average particle size of the positive active material in the direction towards the inner core, a sum of mass concentrations of an element Ti and an element Al was 6975 ppm, and a ratio $w_2$ of masses of the element Ti and the element Al to a total mass of the element Ti and the element Al in the positive active material was 93%.

EMBODIMENT 7

(1) Raw Material Preparation

A ternary material precursor was $[Ni_{0.70}Co_{0.15}Mn_{0.15}](OH)_2$ with a mass of 4300 g.

A Li-containing compound was lithium hydroxide ($LiOH.H_2O$) with a mass of 2035 g.

An M-containing compound was zirconium dioxide ($ZrO_2$).

An M'-containing compound was diboron trioxide ($B_2O_3$).

An M"-containing compound was diboron trioxide ($B_2O_3$).

Based on total mass of the foregoing raw materials, a mass concentration of an element M in an inner core was 1500 ppm, a mass concentration of an element M' in the inner core was 2000 ppm, and a mass concentration of an element M" in a coating layer was 1000 ppm.

(2) Preparation Process

The ternary material precursor $[Ni_{0.70}Co_{0.15}Mn_{0.15}](OH)_2$, lithium hydroxide ($LiOH.H_2O$), zirconium dioxide ($ZrO_2$), and diboron trioxide ($B_2O_3$) were placed in a high-speed mixer for mixing for 1 hour, and a mixed material was transferred to an atmosphere sintering furnace with an $O_2$ concentration of 90% for primary sintering at a temperature of 850° C. for 20 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $B_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 500° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Zr and an element B was 2475 ppm, and a ratio $w_1$ of masses of the element Zr and the element B to a total mass of the element Zr and the element B in the positive active material was 55%; and within a thickness range from the outermost side of the positive active material to a ⅔ average particle size of the positive active material in the direction towards the inner core, a sum of mass concentrations of an element Zr and an element B was 4095 ppm, and a ratio $w_2$ of masses of the element Zr and the element B to a total mass of the element Zr and the element B in the positive active material was 91%.

EMBODIMENT 8

(1) Raw Material Preparation

A ternary material precursor was $[Ni_{0.85}Co_{0.10}Mn_{0.05}](OH)_2$ with a mass of 4300 g.

A Li-containing compound was lithium hydroxide ($LiOH.H_2O$) with a mass of 2035 g.

An M-containing compound was calcium oxide (CaO).

An M'-containing compound was magnesium oxide (MgO).

An M"-containing compound was magnesium oxide (MgO).

Based on total mass of the foregoing raw materials, a mass concentration of an element M in an inner core was 2000 ppm, a mass concentration of an element M' in the inner core was 3000 ppm, and a mass concentration of an element M" in a coating layer was 1000 ppm.

(2) Preparation Process

The ternary material precursor $[Ni_{0.85}Co_{0.10}Mn_{0.05}](OH)_2$, lithium hydroxide ($LiOH.H_2O$), calcium oxide (CaO), and magnesium oxide (MgO) were placed in a high-speed mixer for mixing for 1 hour, and a mixed material was transferred to an atmosphere sintering furnace with an $O_2$ concentration of 90% for primary sintering at a temperature of 750° C. for 20 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and MgO were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 200° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ca and an element Mg was 4320 ppm, and a ratio $w_1$ of masses of the element Ca and the element Mg to a total mass of the element Ca and the element Mg in the positive active material was 72%; and within a thickness range from the outermost side of the positive active material to a ⅔ average particle size of the positive active material in the direction towards the inner core, a sum of mass concentrations of an element Ca and an element Mg was 5820 ppm, and a ratio $w_2$ of masses of the element Ca and the element Mg to a total mass of the element Ca and the element Mg in the positive active material was 97%.

EMBODIMENT 9

(1) Raw Material Preparation

A ternary material precursor was $[Ni_{0.85}Co_{0.10}Mn_{0.05}](OH)_2$ with a mass of 4300 g.

A Li-containing compound was lithium hydroxide ($LiOH.H_2O$) with a mass of 2035 g.

An M-containing compound was calcium oxide (CaO).

An M'-containing compound was a mixture of diboron trioxide ($B_2O_3$), and alumina trioxide ($Al_2O_3$).

An M"-containing compound was a mixture of diboron trioxide ($B_2O_3$), and alumina trioxide ($Al_2O_3$).

Based on total mass of the foregoing raw materials, a mass concentration of an element M in an inner core was 2000 ppm, a mass concentration of an element M' in the inner core was 3000 ppm, and a mass concentration of an element M" in a coating layer was 1000 ppm.

(2) Preparation Process

The ternary material precursor $[Ni_{0.85}Co_{0.10}Mn_{0.05}](OH)_2$, lithium hydroxide ($LiOH.H_2O$), calcium oxide (CaO), diboron trioxide ($B_2O_3$), and alumina trioxide ($Al_2O_3$) were placed in a high-speed mixer for mixing for 1 hour, and a mixed material was transferred to an atmosphere sintering furnace with an $O_2$ concentration of 90% for primary sintering at a temperature of 800° C. for 10 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material, $B_2O_3$, and $Al_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 200° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ca, an element B, and an element Al was 3840 ppm, and a ratio $w_1$ of masses of the element Ca, the element B, and the element Al to a total mass of the element Ca, the element B, and the element Al in the positive active material was 64%; and within a thickness range from the outermost side of the positive active material to a ⅔ average particle size of the positive active material in the direction towards the inner core, a sum of mass concentrations of an element Ca, an element B, and an element Al was 5700 ppm, and a ratio $w_2$ of masses of an element Ca, an element B, and an element Al to a total mass of the element Ca, the element B, and the element Al in the positive active material was 95%.

EMBODIMENT 10

(1) Raw Material Preparation

A ternary material precursor was $[Ni_{0.85}Co_{0.10}Mn_{0.05}](OH)_2$ with a mass of 4300 g.

A Li-containing compound was lithium hydroxide ($LiOH.H_2O$) with a mass of 2035 g.

An M-containing compound was titanium dioxide ($TiO_2$).

An M'-containing compound was alumina trioxide ($Al_2O_3$).

An M"-containing compound was diboron trioxide ($B_2O_3$).

Based on total mass of the foregoing raw materials, a mass concentration of an element M in an inner core was 2500 ppm, a mass concentration of an element M' in the inner core was 2400 ppm, and a mass concentration of an element M" in a coating layer was 1200 ppm.

(2) Preparation Process

The ternary material precursor $[Ni_{0.85}Co_{0.10}Mn_{0.05}](OH)_2$, lithium hydroxide ($LiOH.H_2O$), titanium dioxide ($TiO_2$), and alumina trioxide ($Al_2O_3$) were placed in a high-speed mixer for mixing for 2 hour, and a mixed material was transferred to an atmosphere sintering furnace with an $O_2$ concentration of 80% for primary sintering at a temperature of 800° C. for 10 hours.

The material obtained after the primary sintering was completed was placed in a 0.05 mol/L boric acid aqueous solution for washing. A mass ratio of the material to the washing solution was 1:0.5, and the washing was performed at a temperature of 40° C. for 10 min at an agitation speed of 100 rpm. After the washing was completed, centrifugal separation was performed, and then a solid material obtained from the centrifugation was placed in a vacuum drying oven to dry at 120° C. for 5 hours, to obtain a bulk doped ternary material, which was an inner core of a positive active material.

The bulk doped ternary material and $B_2O_3$ were placed in the high-speed mixer for mixing for 2 hours, and a mixed material was placed in the atmosphere sintering furnace with an $O_2$ concentration of 80% for secondary sintering, to form a coating layer of the positive active material, where the secondary sintering was performed at 400° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti, an element Al, and an element B was 3904 ppm, and a ratio $w_1$ of masses of the element Ti, the element Al, and the element B to a total mass of the element Ti, the element Al, and the element B in the positive active material was 64%; and within a thickness range from the outermost side of the positive active material to a ⅔ average particle size of the positive active material in the direction towards the inner core, a sum of mass concentrations of an element Ti, an element Al, and an element B was 5795 ppm, and a ratio $w_2$ of masses of the element Ti, the element Al, and the element B to a total mass of the element Ti, the element Al, and the element B in the positive active material was 95%.

EMBODIMENT 11

(1) Raw Material Preparation

A ternary material precursor was $[Ni_{0.8}Co_{0.1}0Mn_{0.1}](OH)_2$ with a mass of 4300 g.

A Li-containing compound was lithium hydroxide $(LiOH.H_2O)$ with a mass of 2035 g.

An M-containing compound was titanium dioxide $(TiO_2)$.

An M'-containing compound was alumina trioxide $(Al_2O_3)$.

An M"-containing compound was alumina trioxide $(Al_2O_3)$.

Based on total mass of the foregoing raw materials, a mass concentration of an element M in an inner core was 2000 ppm, a mass concentration of an element M' in the inner core was 2000 ppm, and a mass concentration of an element M" in a coating layer was 400 ppm.

(2) Preparation Process

The ternary material precursor $[Ni_{0.8}Co_{0.1}0Mn_{0.1}](OH)_2$ lithium hydroxide $(LiOH.H_2O)$, titanium dioxide $(TiO_2)$, and alumina trioxide $(Al_2O_3)$ were placed in a high-speed mixer for mixing for 0.5 hour, and a mixed material was transferred to an atmosphere sintering furnace with an $O_2$ concentration of 100% for primary sintering at a temperature of 900° C. for 15 hours.

The material obtained after the primary sintering was completed was placed in a 1 mol/L $C_5H_6B(OH)_2$ in ethanol and water solution for washing. A mass ratio of the material to the washing solution was 1:5, and the washing was performed at a temperature of 30° C. for 2 min at an agitation speed of 20 rpm. After the washing was completed, centrifugal separation was performed, and then a solid material obtained from the centrifugation was placed in a vacuum drying oven to dry at 120° C. for 10 hours, to obtain a bulk doped ternary material, which was an inner core of a positive active material.

The bulk doped ternary material and $Al_2O_3$ were placed in the high-speed mixer for mixing for 0.5 hour, and a mixed material was placed in the atmosphere sintering furnace with the $O_2$ concentration of 100% for secondary sintering, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 2200 ppm, and a ratio $w_1$ of masses of the element Ti and the element Al to a total mass of the element Ti and the element Al in the positive active material was 50%; and within a thickness range from the outermost side of the positive active material to a ⅔ average particle size of the positive active material in the direction towards the inner core, a sum of mass concentrations of an element Ti and an element Al was 4180 ppm, and a ratio $w_2$ of masses of the element Ti and the element Al to the total mass of the element Ti and the element Al in the positive active material was 95%.

EMBODIMENT 12

(1) Raw Material Preparation

A ternary material precursor was $[Ni_{0.8}Co_{0.1}Mn_{0.1}](OH)_2$ with a mass of 4300 g.

A Li-containing compound was lithium hydroxide $(LiOH.H_2O)$ with a mass of 2035 g.

An M-containing compound was titanium dioxide $(TiO_2)$.

An M'-containing compound was alumina trioxide $(Al_2O_3)$.

An M"-containing compound was alumina trioxide $(Al_2O_3)$.

Based on total mass of the foregoing raw materials, a mass concentration of an element M in an inner core was 100 ppm, a mass concentration of an element M' in the inner core was 3000 ppm, and a mass concentration of an element M" in a coating layer was 3000 ppm.

(2) Preparation Process

The ternary material precursor $[Ni_{0.8}Co_{0.1}Mn_{0.1}](OH)_2$ lithium hydroxide $(LiOH.H_2O)$, titanium dioxide $(TiO_2)$, and alumina trioxide $(Al_2O_3)$ were placed in a high-speed mixer for mixing for 0.5 hour, and a mixed material was transferred to an atmosphere sintering furnace with an $O_2$ concentration of 100% for primary sintering, at a temperature of 900° C. for 15 hours.

The material obtained after the sintering was completed was placed in a 0.8 mol/L $(C_3H_7O)_3B$ in ethanol solution for washing. A mass ratio of the material to the washing solution was 1:3, and the washing was performed at a temperature of 35° C. for 3 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $Al_2O_3$ were placed in the high-speed mixer for mixing for 1.5 hour, and a mixed material was placed in the atmosphere sintering furnace with the $O_2$ concentration of 100% for secondary sintering, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 3660 ppm, and a ratio $w_1$ of masses of the elements Ti and the element Al to a total mass of the element Ti and the element Al in the positive active material was 60%; and within a thickness range from the outermost side of the positive active material to a ⅔ average particle size of the positive active material in the direction towards the inner core, a sum of mass concentrations of an element Ti and element Al was 4880 ppm, and a ratio $w_2$ of masses of the element Ti and the element Al to a total mass of the element Ti and the element Al in the positive active material was 80%.

EMBODIMENT 13

(1) Raw Material Preparation

A ternary material precursor was $[Ni_{0.8}Co_{0.1}Mn_{0.1}](OH)_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

An M"-containing compound was alumina trioxide (Al$_2$O$_3$).

A Y-containing compound is NH$_4$F.

Based on total mass of the foregoing above raw materials, a mass concentration of an element M in an inner core was 100 ppm, a mass concentration of an element M' in the inner core was 2000 ppm, a mass concentration of an element Y in the inner core was 1000 ppm, and a mass concentration of an element M" in a coating layer was 600 ppm.

(2) Preparation Process

The ternary material precursor [Ni$_{0.8}$Co$_{0.1}$Mn$_{0.1}$](OH)$_2$, lithium hydroxide (LiOH.H$_2$O), titanium dioxide (TiO$_2$), alumina trioxide (Al$_2$O$_3$), and ammonia fluoride (NH$_4$F) were placed in a high-speed mixer for mixing for 1 hour, and a mixed material was transferred to an atmosphere sintering furnace with an O$_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and Al$_2$O$_3$ were placed in the high-speed mixer for mixing for 2 hours, and a mixed material was placed in the atmosphere sintering furnace with an O$_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti, an element Al, and an element F was 2331 ppm, and a ratio w$_1$ of masses of the element Ti, the element Al, and the element F to a total mass of the element Ti, the element Al, and the element F in the positive active material was 63%; and within a thickness range from the outermost side of the positive active material to a ⅔ average particle size of the positive active material in the direction towards the inner core, a sum of mass concentrations of an element Ti, an element Al, and an element F was 3367 ppm, and a ratio w$_2$ of masses of the element Ti, the element Al, and the element F to a total mass of the element Ti, the element Al, and the element F in the positive active material was 91%.

Comparative Example 1

(1) Raw Material Preparation

A ternary material precursor was [Ni$_{0.8}$Co$_{0.1}$Mn$_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

Based on total mass of the above raw materials, a mass concentration of an element M was 50 ppm.

(2) Preparation Process

The ternary material precursor [Ni$_{0.8}$Co$_{0.1}$Mn$_{0.1}$](OH)$_2$, lithium hydroxide (LiOH.H$_2$O), and titanium dioxide (TiO$_2$) were placed in a high-speed mixer for mixing for 1 hour, and a mixed material was transferred to an atmosphere sintering furnace with an O$_2$ concentration of 90% for sintering at a temperature of 830° C. for 15 hours. The desired positive active material was obtained after the sintering was completed.

In the obtained positive active material: within a thickness range from an outermost side of the positive active material to a ⅕ average particle size of the positive active material, a ratio w$_1$ of a mass of an element Ti to a total mass of the element Ti in the positive active material was 45%; and within a thickness range from the outermost side of the positive active material to a ⅔ average particle size of the positive active material, a ratio w$_2$ of a mass of an element Ti to a total mass of the element Ti in the positive active material was 94%.

Comparative Example 2

(1) Raw Material Preparation

A ternary material precursor was [Ni$_{0.8}$Co$_{0.1}$Mn$_{0.1}$](OH)$_2$ with a mass of 4300 g.

A Li-containing compound was lithium hydroxide (LiOH.H$_2$O) with a mass of 2035 g.

An M-containing compound was titanium dioxide (TiO$_2$).

An M'-containing compound was alumina trioxide (Al$_2$O$_3$).

Based on total mass of the foregoing raw materials, a mass concentration of an element M was 2000 ppm, and a mass concentration of an element M' was 2000 ppm.

(2) Preparation Process

The ternary material precursor [Ni$_{0.8}$Co$_{0.1}$Mn$_{0.1}$](OH)$_2$, lithium hydroxide (LiOH.H$_2$O), titanium dioxide (TiO$_2$), and alumina trioxide (Al$_2$O$_3$) were placed in a high-speed mixer for mixing for 0.5 hour, and a mixed material was transferred to an atmosphere sintering furnace with an O$_2$ concentration of 100% for sintering at a temperature of 830° C. for 15 hours. A bulk doped ternary material was obtained after the sintering was completed, which was the positive active material.

In the obtained positive active material: within a thickness range from an outermost side of the positive active material to a ⅕ average particle size of the positive active material, a ratio w$_1$ of masses of the element Ti and an element Al to a total mass of the element Ti and the element Al in the positive active material was 45%; and within a thickness range from the outermost side of the positive active material to a ⅔ average particle size of the positive active material, a ratio w$_2$ of masses of an element Ti and an element Al to a total mass of the element Ti and the element Al in the positive active material was 94%.

Comparative Example 3

(1) Raw Material Preparation

A ternary material precursor was [Ni$_{0.8}$Co$_{0.1}$Mn$_{0.1}$](OH)$_2$ with a mass of 4300 g.

A Li-containing compound was lithium hydroxide (LiOH.H$_2$O) with a mass of 2035 g.

An M"-containing compound was alumina trioxide (Al$_2$O$_3$).

Based on total mass of the foregoing raw materials, a mass concentration of an element M" in a coating layer was 2000 ppm.

(2) Preparation Process

The ternary material precursor [Ni$_{0.8}$Co$_{0.1}$Mn$_{0.1}$](OH)$_2$, and lithium hydroxide (LiOH.H$_2$O) were placed in a high-speed mixer for mixing for 1 hour, and a mixed material was transferred to an atmosphere sintering furnace with an $O_2$ concentration of 90% for primary sintering at a temperature of 830° C. for 15 hours.

The material obtained after the primary sintering was completed and $Al_2O_3$ were placed in the high-speed mixer for mixing for 1 hour, and a mixed material was placed in the atmosphere sintering furnace with the $O_2$ concentration of 90% for secondary sintering, where the secondary sintering was performed at 650° C. for 5 hours. A desired positive active material was obtained after the secondary sintering was completed.

In the obtained positive active material: within a thickness range from an outermost side of the positive active material to a ⅕ average particle size of the positive active material in a direction towards an inner core, a ratio $w_1$ of a mass of an element Al to a total mass of the element Al in the positive active material was 94%; and within a thickness range from the outermost side of the positive active material to a ⅔ average particle size of the positive active material in the direction towards the inner core, a ratio $w_2$ of a mass of an element Al to a total mass of the element Al in the positive active material was 98%.

Comparative Example 4

(1) Raw Material Preparation

A ternary material precursor was $[Ni_{0.8}Co_{0.1}Mn_{0.1}](OH)_2$ with a mass of 4300 g.

A Li-containing compound was lithium hydroxide ($LiOH.H_2O$) with a mass of 2035 g.

An M-containing compound was titanium dioxide ($TiO_2$).

An M"-containing compound was alumina trioxide ($Al_2O_3$).

Based on total mass of the foregoing raw materials, a mass concentration of an element M in an inner core was 5000 ppm, and a mass concentration of an element M" in a coating layer was 1000 ppm.

(2) Preparation Process

The ternary material precursor $[Ni_{0.8}Co_{0.1}Mn_{0.1}](OH)_2$, lithium hydroxide ($LiOH.H_2O$), and titanium dioxide ($TiO_2$) were placed in a high-speed mixer for mixing for 1 hour, and a mixed material was transferred to an atmosphere sintering furnace with an $O_2$ concentration of 90% for primary sintering at a temperature of 830° C. for 15 hours.

The material obtained after the primary sintering was completed and $Al_2O_3$ were placed in the high-speed mixer for mixing for 1 hour, and a mixed material was placed in the atmosphere sintering furnace with the $O_2$ concentration of 90% for secondary sintering, where the secondary sintering was performed at 650° C. for 5 hours. A desired positive active material was obtained after the secondary sintering was completed.

In the obtained positive active material: within a thickness range from an outermost side of the positive active material to a ⅕ average particle size of the positive active material in a direction towards the inner core, a ratio $w_1$ of masses of an element Ti and an element Al to a total mass of the element Ti and the element Al in the positive active material was 56%; and within a thickness range from the outermost side of the positive active material to a ⅔ average particle size of the positive active material in the direction towards the inner core, a ratio $w_2$ of masses of an element Ti and an element Al to a total mass of the element Ti and the element Al in the positive active material was 96%.

Comparative Example 5

(1) Raw Material Preparation

A ternary material precursor was $[Ni_{0.8}Co_{0.1}Mn_{0.1}](OH)_2$ with a mass of 4300 g.

A Li-containing compound was lithium hydroxide ($LiOH.H_2O$) with a mass of 2035 g.

An M-containing compound was titanium dioxide ($TiO_2$).

An M'-containing compound was alumina trioxide ($Al_2O_3$).

An M"-containing compound was alumina trioxide ($Al_2O_3$).

Based on total mass of the foregoing raw materials, a mass concentration of an element M in an inner core was 1500 ppm, a mass concentration of an element M' in the inner core was 4800 ppm, and a mass concentration of an element M" in a coating layer was 800 ppm.

(2) Preparation Process

The ternary material precursor $[Ni_{0.8}Co_{0.1}Mn_{0.1}](OH)_2$, lithium hydroxide ($LiOH.H_2O$), titanium dioxide ($TiO_2$), and alumina trioxide ($Al_2O_3$) were placed in a high-speed mixer for mixing for 1 hour, and a mixed material was transferred to an atmosphere sintering furnace with an $O_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $Al_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 3053 ppm, and a ratio $w_1$ of masses of the element Ti and the element Al to a total mass of the element Ti and the element Al in the positive active material was 43%; and within a thickness range from the outermost side of the positive active material to a ⅔ average particle size of the positive active material in the direction towards the inner core, a sum of mass concentrations of an element Ti and an element Al was 6887 ppm, and a ratio $w_2$ of masses of the element Ti and the element Al to a total mass of the element Ti and the element Al in the positive active material was 97%.

Comparative Example 6

(1) Raw Material Preparation

A ternary material precursor was $[Ni_{0.8}Co_{0.1}Mn_{0.1}](OH)_2$ with a mass of 4300 g.

A Li-containing compound was lithium hydroxide ($LiOH.H_2O$) with a mass of 2035 g.

An M-containing compound was titanium dioxide ($TiO_2$).

An M'-containing compound was alumina trioxide ($Al_2O_3$).

An M"-containing compound was alumina trioxide ($Al_2O_3$).

Based on total mass of the foregoing raw materials, a mass concentration of an element M in an inner core was 1500 ppm, a mass concentration of an element M' in the inner core was 2000 ppm, and a mass concentration of an element M" in a coating layer was 4000 ppm.

(2) Preparation Process

The ternary material precursor $[Ni_{0.8}Co_{0.1}Mn_{0.1}](OH)_2$, lithium hydroxide ($LiOH \cdot H_2O$), titanium dioxide ($TiO_2$), and alumina trioxide ($Al_2O_3$) were placed in a high-speed mixer for mixing for 1 hour, and a mixed material was transferred to an atmosphere sintering furnace with an $O_2$ concentration of 90% for primary sintering at a temperature of 830° C. for 15 hours.

The material obtained after the primary sintering was completed was placed in a 0.05 mol/L boric acid aqueous solution for washing. A mass ratio of the material to the washing solution was 1:2, and the washing was performed at a temperature of 20° C. for 5 min at an agitation speed of 200 rpm. After the washing was completed, centrifugal separation was performed, and then a solid material obtained from the centrifugation was placed in a vacuum drying oven to dry at 100° C. for 10 hours, to obtain a bulk doped ternary material, which was an inner core of a positive active material.

The bulk doped ternary material and $Al_2O_3$ were placed in the high-speed mixer for mixing for 2 hours, and a mixed material was placed in the atmosphere sintering furnace with an $O_2$ concentration of 90% for secondary sintering, to form a coating layer of the positive active material, where the secondary sintering was performed at 250° C. for 5 hours. The desired positive active material was obtained after the secondary sintering was completed.

In the obtained positive active material: within a thickness range from an outermost side of the positive active material to a ⅕ average particle size of the positive active material in a direction towards the inner core, a sum of mass concentrations of an element Ti and an element Al was 4875 ppm, and a ratio $w_1$ of masses of the element Ti and the element Al to a total mass of the element Ti and the element Al in the positive active material was 65%; and within a thickness range from the outermost side of the positive active material to a ⅔ average particle size of the positive active material in the direction towards the inner core, a sum of mass concentrations of an element Ti and an element Al was 7125 ppm, and a ratio $w_2$ of masses of the element Ti and the element Al to a total mass of the element Ti and the element Al in the positive active material was 95%.

Next, the following describes a test process of the positive active material.

(1) Test of content of lithium impurity in the positive active material.

An acid-base titration method was used to test the content of lithium impurity in the positive active material. Thirty grams of positive active material samples prepared respectively in the embodiments and the comparative examples were placed into 100 ml pure water, and were stirred for 30 min and kept standing for 5 min. Upon suction filtration, ten milliliters of supernatant was taken, and lithium carbonate and lithium hydroxide that were dissolved from the positive active material samples were titrated with 0.05 mol/L hydrochloric acid standard solution. By using a pH electrode as an indicator electrode, an end point was determined by a jump generated by a potential change, and the content of lithium impurity in the positive active material was calculated.

(2) Gram capacity test of the positive active material

The positive active materials prepared in the embodiments and the comparative examples, an acetylene black conductive agent, and a polyvinylidene fluoride (PVDF) bonding agent were mixed at a mass ratio of 90:5:5, added with a solvent N-methylpyrrolidone (NMP), and stirred in a drying room into a uniform system, to obtain a positive electrode slurry. The positive electrode slurry was evenly coated on a positive electrode current collector aluminum foil, and dried and cold pressed to form a positive electrode plate.

Ethylene carbonate (EC), diethyl carbonate (DEC) and dimethyl carbonate (DMC) were mixed in a volume ratio of 1:1:1 to obtain an organic solvent. A fully dried $LiPF_6$ was dissolved in the mixed organic solvent to formulate into an electrolyte with a concentration of 1 mol/L.

A lithium plate was used as a negative electrode plate and assembled with the prepared positive electrode plate to form a standard button battery.

At a voltage of 2.8 V to 4.25 V, the button battery was charged to a voltage of 4.25 V at a constant current of 0.1 C, and then charged at a constant voltage of 4.25 V until the current is less than or equal to 0.05 mA. The battery was left standing for 2 min, and charging capacity in this case was denoted as $C_0$. After that, the battery was charged to 2.8 V at a constant current of 0.1 C, and a discharge capacity in this case was denoted as $D_0$.

A ratio of the discharge capacity $D_0$ to a mass of the positive active material was the gram capacity of the positive active material.

A first Coulombic efficiency of the positive active material (%) was $D_0/C_0 \times 100\%$.

Next, performance of the positive active material in a full battery (that is, a lithium-ion battery) is described.

The positive active materials prepared in the embodiments and the comparative examples were assembled into a lithium-ion battery according to the following method.

(1) Preparation of a positive electrode plate: The positive active materials prepared in the embodiments and the comparative examples, an acetylene black conductive agent, and a polyvinylidene fluoride (PVDF) bonding agent were mixed in a mass ratio of 94:3:3, added with a solvent N-methylpyrrolidone (NMP), and stirred with a vacuum mixer into a uniform system, to obtain a positive electrode slurry. The positive electrode slurry was evenly coated on two surfaces of a positive current collector aluminum foil, dried at a room temperature, and transferred to an oven to continue to be dried, and then cold pressed and cut to obtain the positive electrode plate.

(2) Preparation of a negative electrode plate: A negative active material artificial graphite and hard carbon, conductive agent acetylene black, binder styrene butadiene rubber (SBR), thickener sodium carboxymethyl cellulose (CMC) were mixed at a mass ratio of 90:5:2:2:1, added with a solvent deionized water, stirred with a vacuum mixer into a uniform system, to obtain a negative electrode slurry. The negative electrode slurry was evenly coated on two surfaces of the negative current collector copper foil, dried at a room temperature, transferred to an oven to continue to be dried, and then cold pressed and cut to obtain the negative electrode plate.

(3) Preparation of an electrolyte: Ethylene carbonate (EC), diethyl carbonate (DEC) and dimethyl carbonate (DMC) were mixed in a volume ratio of 1:1:1 to obtain an organic solvent. A fully dried $LiPF_6$ was then dissolved in the mixed organic solvent to prepare an electrolyte with a concentration of 1 mol/L.

(4) Preparation of a separator: A polyethylene (PE) membrane was used as the separator.

(5) Preparation of a lithium-ion battery: The positive electrode plate, the separator, and the negative electrode plate were stacked in sequence, so that the separator was located between the positive electrode plate and negative electrode plate to provide separation, and then wound to obtain a bare cell. The bare cell was placed in an outer package and dried, and electrolyte was then injected. The lithium-ion battery was obtained after vacuum packaging, standing, forming, shaping, and other processes were performed.

A test procedure for the lithium-ion battery is described below.

(1) Initial discharge gram capacity test of the lithium-ion battery

In a constant temperature environment of 25° C., the lithium-ion battery was left standing for 5 min, discharged to 2.8 V at a constant current of ⅓ C, left standing for 5 min, and then charged to 4.25 V at a constant current of ⅓ C. After that, the battery was charged at a constant voltage of 4.25 V until the current was less than or equal to 0.05 mA, left for standing for 5 min, and a charge capacity in this case was denoted as $C_0$. The battery was then discharged to 2.8 V at a constant current of ⅓ C, and a discharge capacity in this case was denoted as $D_0$.

A ratio of a discharge capacity $D_1$ to a mass of the positive active material was an initial gram capacity of the lithium-ion battery.

A first Coulombic efficiency of the lithium-ion battery (%) was $D_0/C_0 \times 100\%$.

(2) Normal temperature cycle performance test of the lithium-ion battery

In a constant temperature environment of 25° C., the lithium-ion battery was charged to 4.25 V at a constant current of 1 C, charged at a constant voltage of 4.25 V until the current was less than or equal to 0.05 mA, left standing for 5 min, and then discharged to 2.8 V at a constant current of 1 C, which completed one charge and discharge cycle. A discharge capacity in this case was a discharge capacity of the first cycle. Charge/discharge testing was performed for the lithium-ion battery for 1200 cycles according to the foregoing method, to detect a discharge capacity at the $1200^{th}$ cycle.

A capacity retention rate (%) of the lithium-ion battery after 1200 cycles at 25° C. was equal to (the discharge capacity at the $1200^{th}$ cycle/the discharge capacity at the first cycle)×100%.

(3) High temperature cycle performance test of the lithium-ion battery

In a constant temperature environment of 45° C., the lithium-ion battery was charged to 4.25 V at a constant current of 1 C, charged at a constant voltage of 4.25 V until the current was less than or equal to 0.05 mA, left standing for 5 min, and then discharged to 2.8 V at a constant current of 1 C, which was one charge and discharge cycle. A discharge capacity at this time was a discharge capacity of the first cycle. Charge/discharge testing was performed for the lithium-ion battery for 800 cycles according to the foregoing method, to detect a discharge capacity at the $800^{th}$ cycle.

A capacity retention rate (%) of the lithium-ion battery after 800 cycles at 45° C. was equal to (the discharge capacity at the $800^{th}$ cycle/the discharge capacity at the first cycle)×100%.

(4) High temperature storage performance test of the lithium-ion battery

First, the lithium-ion battery was fully charged at 25° C. A drainage method was used to test volume of the fully-charged lithium-ion battery, which was denoted as $V_1$. The lithium-ion battery was stored at 80° C. and taken out every 48 hours, where the battery was left standing and cooled to room temperature, and was then tested for a volume of the lithium-ion battery according to the drainage method, until the test was completed after the lithium-ion battery had been stored for 10 full days. The volume of the lithium-ion battery after the storage was completed was denoted as $V_{10}$.

A volume expansion rate (%) of the lithium-ion battery that had been stored at 80° C. for 10 days was $(V_{10}/V_1-1)\times 100\%$.

TABLE 1

Test results of the embodiments 1 to 13 and the comparative examples 1 to 6

| | Positive active material | | | | | | Lithium-ion battery | | |
|---|---|---|---|---|---|---|---|---|---|
| | D50 (μm) | Thickness T (μ) | w1 | w2 | Content of lithium impurity ppm | Gram capacity mAh/g | Initial gram capacity mAh/g | Capacity retention rate after 1200 cycles at 25° C. | Capacity retention rate after 800 cycles at 45° C. | Volumne expansion rate after storage for 10 days at 80° C. |
| Embodiment 1 | 11 | 0.1 | 60% | 93% | 755 | 208.7 | 201.6 | 90.8% | 87.0% | 24.1% |
| Embodiment 2 | 11 | 0.1 | 60% | 93% | 784 | 208.1 | 200.8 | 91.1% | 87.3% | 23.2% |
| Embodiment 3 | 11 | 0.1 | 60% | 93% | 812 | 207.1 | 200.1 | 90.6% | 88.1% | 24.5% |
| Embodiment 4 | 11 | 0.006 | 60% | 93% | 790 | 207.5 | 200.4 | 89.2% | 86.5% | 25.7% |
| Embodiment 5 | 8 | 0.15 | 60% | 93% | 848 | 207.0 | 200.2 | 90.5% | 87.7% | 24.9% |
| Embodiment 6 | 10 | 0.2 | 60% | 93% | 823 | 206.7 | 199.5 | 90.1% | 87.3% | 25.3% |
| Embodiment 7 | 10 | 0.07 | 55% | 91% | 1023 | 206.9 | 200.5 | 89.8% | 86.8% | 23.3% |
| Embodiment 8 | 10 | 0.07 | 72% | 97% | 932 | 207.2 | 201.1 | 90.2% | 87.6% | 24.9% |
| Embodiment 9 | 10 | 0.07 | 64% | 95% | 879 | 205.8 | 199.8 | 89.2% | 87.2% | 25.2% |

TABLE 1-continued

Test results of the embodiments 1 to 13 and the comparative examples 1 to 6

| | Positive active material | | | | | | Lithium-ion battery | | | |
|---|---|---|---|---|---|---|---|---|---|---|
| | D50 (μm) | Thickness T (μ) | w1 | w2 | Content of lithium impurity ppm | Gram capacity mAh/g | Initial gram capacity mAh/g | Capacity retention rate after 1200 cycles at 25° C. | Capacity retention rate after 800 cycles at 45° C. | Volumne expansion rate after storage for 10 days at 80° C. |
| Embodiment 10 | 15 | 0.08 | 64% | 95% | 1057 | 207.3 | 200.8 | 89.1% | 87.4% | 25.3% |
| Embodiment 11 | 20 | 0.002 | 50% | 95% | 1121 | 206.1 | 200.3 | 88.6% | 86.1% | 34.2% |
| Embodiment 12 | 8 | 0.3 | 60% | 80% | 1024 | 207.2 | 200.5 | 86.5% | 83.5% | 26.5% |
| Embodiment 13 | 10 | 0.05 | 63% | 91% | 1067 | 206.8 | 200.1 | 89.1% | 86.9% | 25.2% |
| Comparative example 1 | 11 | / | 45% | 94% | 2341 | 193.2 | 187.8 | 77.3% | 63.8% | 65.3% |
| Comparative example 2 | 11 | / | 45% | 94% | 1670 | 195.9 | 189.8 | 83.5% | 78.2% | 45.9% |
| Comparative example 3 | 11 | 0.13 | 94% | 98% | 1895 | 197.2 | 192.3 | 82.3% | 76.2% | 38.6% |
| Comparative example 4 | 11 | 0.07 | 56% | 96% | 1720 | 192.5 | 187.1 | 80.7% | 73.2% | 44.8% |
| Comparative example 5 | 11 | 0.05 | 43% | 97% | 2038 | 190.2 | 185.3 | 85.8% | 80.2% | 32.6% |
| Comparative example 6 | 11 | 0.28 | 65% | 95% | 2587 | 191.3 | 185.8 | 84.9% | 79.8% | 30.8% |

By analyzing test results in Table 1, it can be learned that the positive active materials prepared in the comparative examples 1 to 4 generally have the problems of high lithium impurity content and low gram capacity. As such, the lithium-ion batteries generally have the problems of low initial discharge gram capacity, poor normal temperature, high temperature cycle performances, and poor high temperature storage performance.

In the comparative example 1, the positive active material is only bulk-doped with a small amount of the element Ti and had no coating layer. The positive active material has high content of lithium impurity and low gram capacity, while the lithium-ion battery has very poor normal temperature cycle performance, high temperature cycle performance, and high temperature storage performance.

In the comparative example 2, the positive active material is doped with both the element Ti and the element Al, but also has no coating layer. Compared with the comparative example 1, the content of lithium impurity in the positive active material is reduced, and the gram capacity of the positive active material and the initial discharge gram capacity of the lithium-ion battery are improved. The normal temperature cycle performance, high temperature cycle performance, and high temperature storage performance of the lithium-ion battery are improved. However, the improvement is limited. A possible reason is that the content of the strong oxidizing nickel in the positive active material is still high, and there are many side reactions between the electrolyte and the positive active material. Therefore, the lithium-ion battery still has serious gassing.

In the comparative example 3, the positive active material contains only the coating layer. Compared with the comparative example 1, the content of lithium impurity in the positive active material is reduced, and the gram capacity of the positive active material and the initial discharge gram capacity of the lithium-ion battery are increased. The normal temperature cycle performance, high temperature cycle performance, and high temperature storage performance of the lithium-ion battery are also improved. However, the improvement is limited. A possible reason is that the ternary material inner core of the positive active material has poor thermal stability and structural stability. In a high-temperature environment and during repeated charging and discharging, as the mixing ratio of $Ni^{2+}$ and $Li^+$ keeps increasing, the layered structure may collapse, which further makes the performance, especially the cycle performance of the lithium-ion battery still poor.

In the comparative example 4, the positive active material was bulk-doped with higher content of the element Ti, and the surface was also coated with $Al_2O_3$. Compared with the comparative example 1, the content of lithium impurity in the positive active material was reduced, while the normal temperature cycle performance, high temperature cycle performance and high temperature storage performance of the lithium ion battery were slightly improved, but the improvement was limited. A possible reason is that the ternary material inner core of the positive active material has poor structural stability. During repeated charging and discharging of the lithium-ion battery, as a mixing ratio of $Ni^{2+}$ to $Li^+$ keeps increasing, the layered structure of the inner core of the ternary material may collapse, so that the performance, especially the cycle performance of the lithium-ion battery, is still poor.

In the embodiments 1 to 13, the positive active material is bulk-doped with the elements M, M', and Y, and coated with the oxide of the coating element M". The positive active material may feature high gram capacity and high structural stability and high thermal stability, and have low content of lithium impurity. This makes the lithium-ion battery have high initial discharge gram capacity, and have excellent normal temperature, high temperature cycle performance, and high temperature storage performance.

In the comparative example 5, although the positive active material is bulk-doped with the elements Ti and Al and coated with $Al_2O_3$, a mass ratio of Al in the coating layer to the bulk doped Al is 1:6. This indicates that the content of Al in the coating layer is too small to ensure that the surface layer of the positive active material features high structural stability and high thermal stability.

In the comparative example 6, although the positive active material is bulk-doped with the elements Ti and Al and coated with $Al_2O_3$, a mass ratio of Al in the coating layer to the bulk doped Al is 1:0.5. This indicates that the content of Al in the coating layer is too high, and the coating layer imposes too much hindrance to the intercalation and deintercalation of lithium ions. This affects the gram capacity development of the positive active material, and further affects the performance of the lithium-ion battery.

What is claimed is:

1. A positive active material, comprising:
an inner core; and
a coating layer that coats a surface of the inner core, wherein
the inner core is selected from a ternary material with a molecular formula of $Li_{1+a}[Ni_xCo_yMn_zM_bM'_c]O_{2-d}Y_d$, wherein a doping element M is selected from one or more of Zr, Ti, Te, Ca, and Si; a doping element M' is selected from one or more of Mg, Zn, Al, B, Ce, and Fe; a doping element Y is selected from one or more of F, Cl, and Br; $-0.1 \leq a \leq 0.2$, $0 < d \leq 0.1$, $0.7 \leq x < 1$, $0 < y < 0.3$, $0 < z < 0.3$, $0 < b \leq 0.1$, $0 < c \leq 0.1$ and $x+y+z+b+c=1$; and distribution of each of the doping elements M, M', and Y in the inner core meets the following condition: there is a reduced mass concentration gradient from an outer side of the inner core to a center of the inner core;
the coating layer is made of a material that is an oxide of a coating element M", and M" is selected from one or more of Mg, Zn, Al, B, Ce, and Fe; and
a mass ratio of the coating element M" in the coating layer to the doping element M' in the inner core is 1:1 to 1:5.

2. The positive active material according to claim 1, wherein within a thickness range from an outermost side of the positive active material to a ⅕ average particle size of the positive active material in a direction towards the inner core, a sum of masses of M, M', Y, and M" is more than 50% of a total mass of M, M', Y, and M" in the positive active material.

3. The positive active material according to claim 2, wherein the sum of masses of M, M', Y, and M" is more than 55% of the total mass of M, M', Y, and M" in the positive active material.

4. The positive active material according to claim 2, wherein in the thickness range from the outermost side of the positive active material to a ⅔ average particle size of the positive active material in the direction towards the inner core, the sum of the masses of M, M', Y, and M" is more than 90% of the total mass of M, M', Y, and M" in the positive active material.

5. The positive active material according to claim 2, wherein the sum of the masses of M, M', Y, and M" is more than 93% of the total mass of M, M', Y, and M" in the positive active material.

6. The positive active material according to claim 1, wherein the coating element M" in the coating layer is the same as the doping element M' in the inner core.

7. The positive active material according to claim 1, wherein based on the total mass of the positive active material,
a mass concentration of the doping element M in the inner core is 100 ppm to 3000 ppm;
a mass concentration of the doping element M' in the inner core is 100 ppm to 3000 ppm; and
a mass concentration of the coating element M" in the coating layer is 100 ppm to 3000 ppm.

8. The positive active material according to claim 1, wherein
an average particle size D50 of the positive active material is 8 μm to 20 μm, and a thickness T of the coating layer is 0.001 μm to 0.5 μm.

9. The positive active material according to claim 8, wherein $0.005 \leq T/D50 \leq 0.02$.

10. The positive active material according to claim 1, wherein the positive active material contains lithium impurity, the lithium impurity comprises lithium hydroxide and lithium carbonate, and a concentration of the lithium impurity is less than or equal to 1500 ppm.

11. An electrochemical battery, comprising a positive active material, the positive active material comprising:
an inner core; and
a coating layer that coats a surface of the inner core, wherein
the inner core is selected from a ternary material with a molecular formula of $Li_{1+a}[Ni_xCo_yMn_zM_bM'_c]O_{2-d}Y_d$, wherein a doping element M is selected from one or more of Zr, Ti, Te, Ca, and Si; a doping element M' is selected from one or more of Mg, Zn, Al, B, Ce, and Fe; a doping element Y is selected from one or more of F, Cl, and Br; $-0.1 \leq a \leq 0.2$, $0 < d \leq 0.1$, $0.7 \leq x < 1$, $0 < y < 0.3$, $0 < z < 0.3$, $0 < b \leq 0.1$, $0 < c \leq 0.1$ and $x+y+z+b+c=1$; and distribution of each of the doping elements M, M', and Y in the inner core meets the following condition: there is a reduced mass concentration gradient from an outer side of the inner core to a center of the inner core;
the coating layer is made of a material that is an oxide of a coating element M", and M" is selected from one or more of Mg, Zn, Al, B, Ce, and Fe; and
a mass ratio of the coating element M" in the coating layer to the doping element M' in the inner core is 1:1 to 1:5.

12. A battery module, comprising the electrochemical battery according to claim 11, used as a battery cell.

13. A battery pack, comprising the battery module according to claim 12.

14. An apparatus, comprising the electrochemical battery according to claim 11, wherein the electrochemical battery is used as a power supply of the apparatus.

15. The apparatus according to claim 14, wherein the apparatus is one selected from the group consisting of an electric vehicle, a hybrid electric vehicle, a plug-in hybrid electric vehicle, an electric bicycle, an electric scooter, an electric golf cart, an electric truck, an electric vessel, and an energy storage system.

* * * * *